United States Patent
Patel et al.

(10) Patent No.: US 11,552,795 B2
(45) Date of Patent: Jan. 10, 2023

(54) KEY RECOVERY

(71) Applicant: MICROSOFT TECHNOLOGY LICENSING, LLC, Redmond, WA (US)

(72) Inventors: Ankur Patel, Sammamish, WA (US); Daniel James Buchner, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1048 days.

(21) Appl. No.: 15/994,334

(22) Filed: May 31, 2018

(65) Prior Publication Data

US 2019/0229909 A1 Jul. 25, 2019

Related U.S. Application Data

(60) Provisional application No. 62/626,564, filed on Feb. 5, 2018, provisional application No. 62/620,300, filed on Jan. 22, 2018.

(51) Int. Cl.
  *H04L 29/06* (2006.01)
  *H04L 9/08* (2006.01)
  (Continued)

(52) U.S. Cl.
  CPC ...... *H04L 9/0894* (2013.01); *G06F 16/24578* (2019.01); *G06F 16/907* (2019.01);
  (Continued)

(58) Field of Classification Search
  CPC .................................................. H04L 9/0894
  See application file for complete search history.

(56) References Cited

U.S. PATENT DOCUMENTS 5,201,000 A * 4/1993 Matyas ............... G06F 9/30003
  380/30
7,334,125 B1 * 2/2008 Pellacuru .............. H04L 9/083
  380/278
(Continued)

FOREIGN PATENT DOCUMENTS

CN      107480986 A    12/2017
EP        0534420 A2     3/1993
(Continued)

OTHER PUBLICATIONS

"Non-Final Office Action Issued in U.S. Appl. No. 15/994,331", dated Jul. 17, 2020, 9 Pages. (MS# 404643-US-NP).
(Continued)

*Primary Examiner* — Maung T Lwin
(74) *Attorney, Agent, or Firm* — Workman Nydegger

(57) ABSTRACT

Generating a private key recovery seed based on random words extracted from an input memory of a user and using the recovery seed to recover the private key. An input that is related to a specific memory of a user is received. The specific memory was previously entered and used to generate random words that are related to each other by being included in the specific memory. The random words are extracted from the received input. The random words are associated with a first private key recovery mechanism for recovering a private key. The random words are input into the first private key recovery mechanism to generate a recovery seed. The recovery seed is input into a second private key recovery mechanism. The second private key recovery mechanism generates a recovered private key upon performing a recovery operation on the private key recovery seed.

20 Claims, 5 Drawing Sheets

(51) Int. Cl.
*G06F 21/45* (2013.01)
*G06F 21/33* (2013.01)
*G06F 16/901* (2019.01)
*H04L 9/32* (2006.01)
*G06F 16/907* (2019.01)
*G06F 16/2457* (2019.01)
*H04L 9/40* (2022.01)
*G06Q 20/36* (2012.01)
*G06Q 20/38* (2012.01)
*H04L 9/06* (2006.01)
*H04L 9/14* (2006.01)
*H04L 9/30* (2006.01)
*G06F 21/62* (2013.01)
*H04L 9/00* (2022.01)

(52) U.S. Cl.
CPC .......... *G06F 16/9014* (2019.01); *G06F 21/33* (2013.01); *G06F 21/45* (2013.01); *G06F 21/6218* (2013.01); *G06Q 20/3674* (2013.01); *G06Q 20/3821* (2013.01); *G06Q 20/3829* (2013.01); *H04L 9/0637* (2013.01); *H04L 9/083* (2013.01); *H04L 9/0869* (2013.01); *H04L 9/0891* (2013.01); *H04L 9/14* (2013.01); *H04L 9/30* (2013.01); *H04L 9/321* (2013.01); *H04L 9/3236* (2013.01); *H04L 9/3239* (2013.01); *H04L 9/3247* (2013.01); *H04L 63/08* (2013.01); *H04L 63/102* (2013.01); *H04L 63/20* (2013.01); *G06F 2221/2131* (2013.01); *G06F 2221/2141* (2013.01); *H04L 9/50* (2022.05)

(56) References Cited

U.S. PATENT DOCUMENTS

| | | | |
|---|---|---|---|
| 7,552,469 | B2 | 6/2009 | Diffie et al. |
| 7,610,491 | B1 | 10/2009 | Tsao |
| 7,761,425 | B1 | 7/2010 | Erickson et al. |
| 7,827,147 | B1 | 11/2010 | D'Hoye et al. |
| 8,245,271 | B2 | 8/2012 | Chan et al. |
| 8,566,952 | B1 | 10/2013 | Michaels |
| 8,667,265 | B1* | 3/2014 | Hamlet ................ H04L 9/3278 713/185 |
| 8,769,271 | B1 | 7/2014 | Osmond et al. |
| 8,806,218 | B2 | 8/2014 | Hatakeda |
| 8,931,054 | B2 | 1/2015 | Huynh et al. |
| 9,137,238 | B1 | 9/2015 | Jakobsson |
| 9,251,114 | B1 | 2/2016 | Ancin et al. |
| 9,424,400 | B1 | 8/2016 | Blankenbeckler et al. |
| 9,959,522 | B2 | 5/2018 | Kenna et al. |
| 9,992,028 | B2 | 6/2018 | Androulaki et al. |
| 2002/0156726 | A1 | 10/2002 | Kleckner et al. |
| 2003/0070072 | A1 | 4/2003 | Nassiri |
| 2005/0177376 | A1* | 8/2005 | Cooper ................ G10L 15/065 704/277 |
| 2006/0212931 | A1 | 9/2006 | Shull et al. |
| 2007/0074027 | A1 | 3/2007 | Tung |
| 2007/0245149 | A1 | 10/2007 | Lin |
| 2007/0252001 | A1 | 11/2007 | Kail et al. |
| 2007/0300076 | A1 | 12/2007 | Diffie et al. |
| 2009/0158041 | A1 | 6/2009 | Kang et al. |
| 2009/0300723 | A1 | 12/2009 | Nemoy et al. |
| 2009/0300742 | A1 | 12/2009 | Ahn |
| 2010/0142713 | A1* | 6/2010 | Perlman ................ H04L 9/0894 380/286 |
| 2010/0145997 | A1 | 6/2010 | Zur et al. |
| 2010/0199098 | A1 | 8/2010 | King |
| 2011/0002461 | A1* | 1/2011 | Erhart ..................... G06F 21/73 340/5.83 |
| 2013/0067229 | A1* | 3/2013 | German .............. H04L 63/0846 713/171 |
| 2015/0172286 | A1 | 6/2015 | Tomlinson et al. |
| 2016/0191241 | A1 | 6/2016 | Allen |
| 2016/0275309 | A1 | 9/2016 | Austin et al. |
| 2017/0155515 | A1 | 6/2017 | Androulaki et al. |
| 2017/0180128 | A1 | 6/2017 | Lu |
| 2017/0222814 | A1 | 8/2017 | Oberhauser et al. |
| 2017/0317824 | A1 | 11/2017 | Brown |
| 2017/0317833 | A1 | 11/2017 | Smith et al. |
| 2017/0317834 | A1 | 11/2017 | Smith et al. |
| 2018/0307853 | A1 | 10/2018 | Mehta et al. |
| 2019/0036692 | A1 | 1/2019 | Sundaresan et al. |
| 2019/0089546 | A1* | 3/2019 | Garcia Morchon .... H04L 9/083 |
| 2019/0228406 | A1 | 7/2019 | Patel et al. |
| 2019/0229914 | A1 | 7/2019 | Patel et al. |
| 2019/0230073 | A1 | 7/2019 | Patel et al. |
| 2019/0230092 | A1 | 7/2019 | Patel et al. |
| 2019/0245688 | A1 | 8/2019 | Patin |
| 2020/0280440 | A1 | 9/2020 | Bollen et al. |
| 2021/0211287 | A1 | 7/2021 | Roy et al. |
| 2021/0266162 | A1 | 8/2021 | Murdoch et al. |
| 2021/0398134 | A1 | 12/2021 | Dumas et al. |

FOREIGN PATENT DOCUMENTS

| | | |
|---|---|---|
| WO | 2010019916 A1 | 2/2010 |
| WO | 2017145049 A1 | 8/2017 |
| WO | 2019143584 A1 | 7/2019 |

OTHER PUBLICATIONS

"Notice of Allowance issued in U.S. Appl. No. 15/994,893", dated Mar. 26, 2020, 13 Pages. (MS# 403731-US-NP).
Tang, et al., "Efficient Multi-Party Digital Signature Using Adaptive Secret Sharing for Low-Power Devices in Wireless Networks", In Proceedings of IEEE Transactions on Wireless Communications vol. 8 , Issue: 2, Feb. 20, 2009, pp. 882-889.
"International Search Report and Written Opinion Issued in PCT Application No. PCT/US19/013558", dated Apr. 9, 2019, 12 Pages (MS# 403731-WO-PCT).
"International Search Report and Written Opinion Issued in PCT Application No. PCT/US19/013559", dated Apr. 8, 2019, 11 Pages (MS# 404643-WO-PCT).
"International Search Report and Written Opinion Issued in PCT Application No. PCT/US19/013560", dated Apr. 8, 2019, 11 Pages. (MS# 404645-WO-PCT).
"International Search Report and Written Opinion Issued in PCT Application No. PCT/US19/013562", dated Apr. 16, 2019, 6 Pages. (MS# 404644-WO-PCT).
"Notice of Allowance Issued in U.S. Appl. No. 15/994,900", dated Jul. 2, 2021, 20 Pages. (MS# 403783-US-NP).
"Creative Commons", Retrieved from: https://creativecommons.org/licenses/by/3.0/, Retrieved on Jan. 22, 2018, 1 Page.
"Flaticon", Retrieved from: https://www.flaticon.com/, Retrieved on Jan. 22, 2018, 14 Pages.
"Freepik", Retrieved from: https://www.freepik.com/, Retrieved on Jan. 22, 2018, 18 Pages.
"Non Final Office Action Issued in U.S. Appl. No. 15/994,900", dated May 20, 2020, 25 Pages. (MS# 403783-US-NP).
Antonopoulos, Andreasm., "Mastering Bitcoin", In Publication of O'Reilly Media, Inc, Dec. 2014, pp. 88-99.
White, Ron, "How Computers Work", In Book of "How Computers Work", Seventh Edition, Published by Que. Oct. 2003, 23 Pages.
"Non Final Office Action Issued in U.S. Appl. No. 15/994,337", dated Feb. 3, 2020, 8 Pages. (MS# 404645-US-NP).
"Non Final Office Action Issued in U.S. Appl. No. 15/994,893", dated Jan. 7, 2020, 33 Pages. (MS# 403731-US-NP).
Gutoski, et al., "Hierarchical Deterministic Bitcoin Wallets that Tolerate Key Leakage", In Proceedings of the International Conference on Financial Cryptography and Data Security, Jan. 26, 2015, 9 Pages.
"International Search report Issued In PCT Application No. PCT/US2019/013561", dated Jul. 3, 2019, 12 Pages. (MS# 403783-WO-PCT).
"Final Office Action Issued in U.S. Appl. No. 15/994,900", dated Nov. 5, 2020, 37 Pages. (MS# 403783-US-NP).

(56) References Cited

OTHER PUBLICATIONS

"Office Action Issued in European Patent Application No. 19703485.3", dated Jan. 5, 2022, 5 Pages. (MS# 404643-EP-EPT).
"Office Action Issued in European Patent Application No. 19703828.4", dated Jan. 5, 2022, 4 Pages. (MS# 404645-EP-EPT).
"Non Final Office Action Issued in U.S. Appl. No. 16/800,465", dated Mar. 8, 2022, 22 Pages. (MS# 408094-US-NP).
"Office Action Issued in European Patent Application No. 19703827.6", dated Mar. 21, 2022, 4 Pages. (MS# 403731-EP-EPT).
"International Search Report and Written Opinion Issued in PCT Application No. PCT/US21/014415", dated Mar. 24, 2021, 12 Pages. (MS# 408094-WO-PCT).
"Notice of Allowance Issued in U.S. Appl. No. 16/800,465", dated Jun. 27, 2022, 9 Pages. (MS# 408094-US-NP).
"Notice of Allowance Issued in European Patent Application No. 19703827.6", dated Jun. 3, 2022, 7 Pages. (MS# 403731-EP-EPT).
"Notice of Allowance Issued in European Patent Application No. 19703827.6", dated Sep. 15, 2022, 3 Pages.

\* cited by examiner

KEY RECOVERY

CROSS-REFERENCE TO RELATED APPLICATIONS

This application claims the benefit of and priority to U.S. Provisional Patent Application Ser. No. 62/620,300 filed on Jan. 22, 2018, entitled "Decentralized Identity Platform," and U.S. Provisional Patent Application Ser. No. 62/626,564 filed on Feb. 5, 2018, entitled "Decentralized Identity Platform", which applications are expressly incorporated herein by reference in their entireties.

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, computer program products, and methods for generating a private key recovery seed based on random words extracted from an input memory of a user and for using the private key recovery seed to recover the private key. An input that is related to a specific memory of a user is received. The specific memory was previously entered and used to generate random words that are related to each other by being included in the specific memory. The random words are extracted from the received input so that the user does not need to enter any other random words not related to the input memory. The extracted random words are associated with a first private key recovery mechanism for recovering a private key. The random words are input into the first private key recovery mechanism to generate a private key recovery seed. The private key recovery seed is input into a second private key recovery mechanism. The second private key recovery mechanism generates a recovered private key upon performing a recovery operation on the private key recovery seed.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
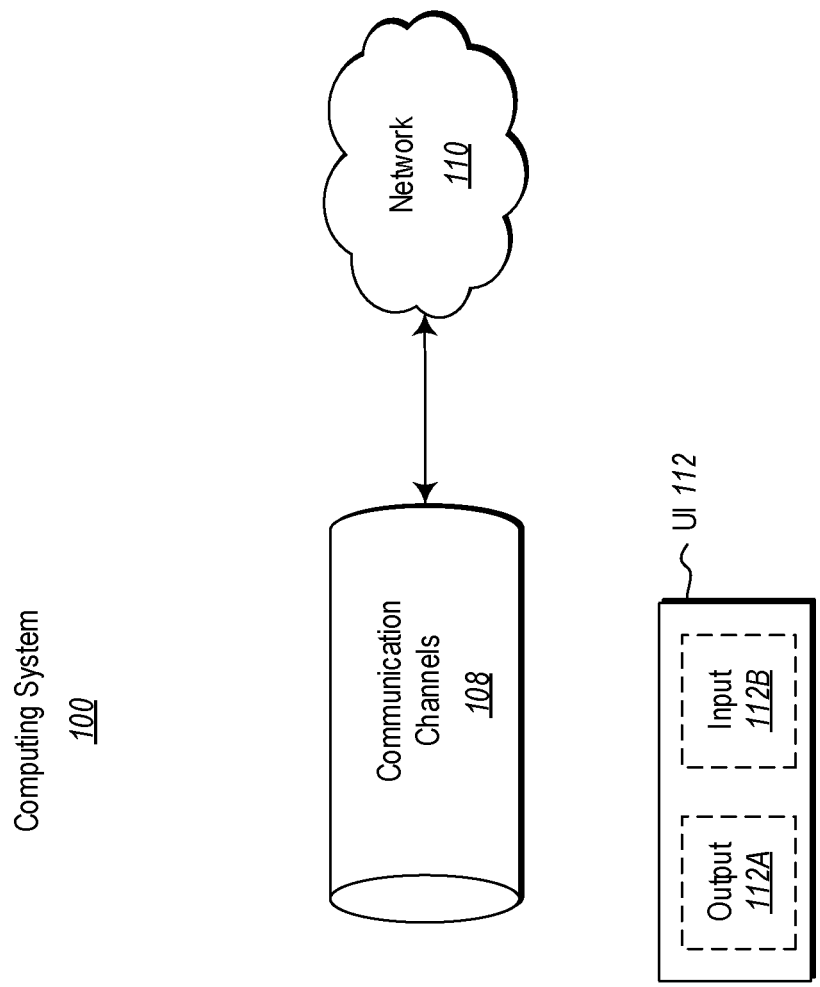
FIG. 1 illustrates an example computing system in which the principles described herein may be employed.

Embodiments disclosed herein are related to computing systems, computer program products, and methods for generating a private key recovery seed based on random words extracted from an input memory of a user and for using the private key recovery seed to recover the private key. An input that is related to a specific memory of a user is received. The specific memory was previously entered and used to generate random words that are related to each other by being included in the specific memory. The random words are extracted from the received input so that the user does not need to enter any other random words not related to the input memory. The extracted random words are associated with a first private key recovery mechanism for recovering a private key. The random words are input into the first private key recovery mechanism to generate a private key recovery seed. The private key recovery seed is input into a second private key recovery mechanism. The second private key recovery mechanism generates a recovered private key upon performing a recovery operation on the private key recovery seed.

In the embodiments, the recovery mechanism is deterministic based on an input memory of a user and random words that are generated from the input memory. Unlike some conventional recovery mechanisms that generate random words that are unrelated to each other, the embodiments disclosed use random words that are related to the input memory. Thus, the user need not remember any unrelated words or have to store them in a location, where they may be accessed by a hostile party. Instead, the user need only remember the input memory (or at least a sufficient portion of the input memory) and the recovery mechanism will determine the words from the input memory. This process will be described in more detail to follow. This provides a technical advance over the conventional systems that require a user to remember or at least record randomly generated words since the randomly generated words are not related to each other in any meaningful way. Accordingly, user convenience is enhanced since the user only needs to remember the input memory and security is enhanced since the unrelated random words do not need to recorded or stored.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Decentralized Identification (DID)

Figure 2:
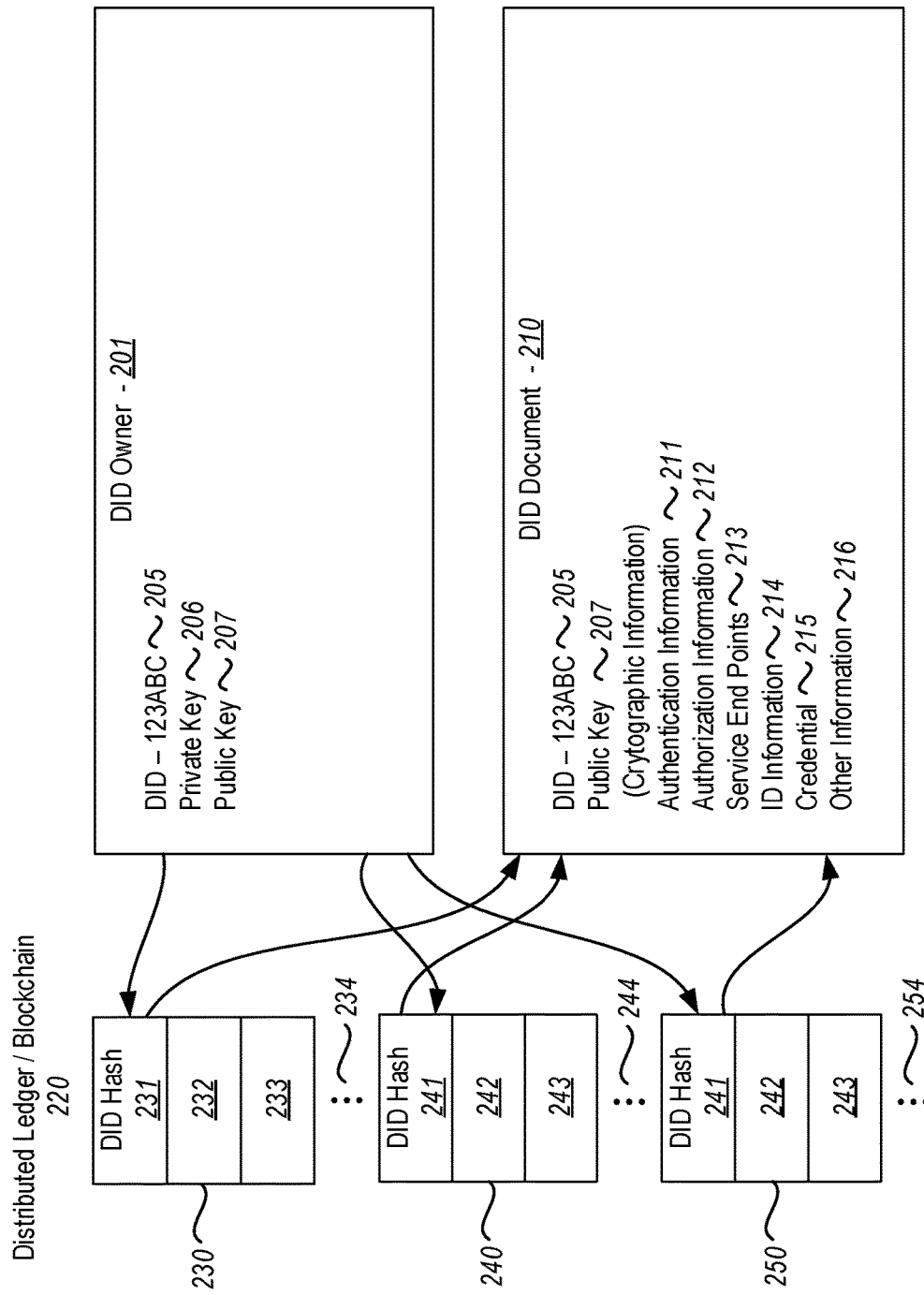
FIG. 2 illustrates an example environment for creating a Decentralized Identification (DID).

Some introductory discussion of a decentralized identification (DID) and the environment is which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource Identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein) Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. Thus, the private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child in no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree, a work history, or any other information about the DID owner 201's background.

The DID document 210 may also include various other information 216. In some embodiments, the other information 216 may include metadata specifying when the DID document 210 was created and/or when it was last modified. In other embodiments, the other information 215 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed portion 230, a second distributed portion 240, a third distributed portion 250, and any number of additional distributed portions as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each portion of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exits. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

DID Lifecycle Management

Figure 3:
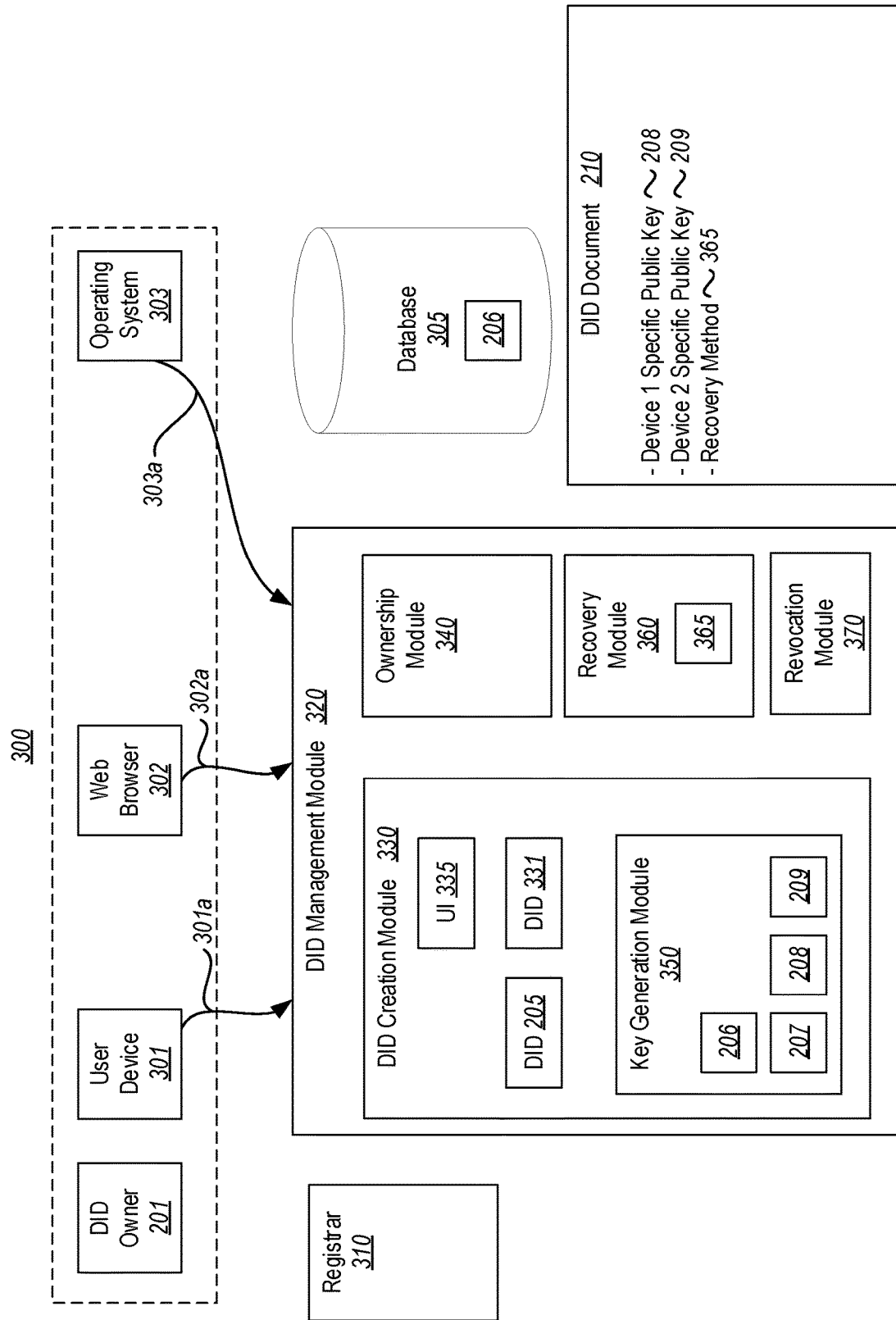
FIG. 3 illustrates an example environment for various DID lifecycle management operations and services.

Having described DIDs and how they operate generally with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smart phone, a computing device such as a laptop computer, or any device such as a car or an appliance that includes computing abilities. The devices 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifecycle management module 320. It will be noted that in operation, the DID lifecycle management module 320 may reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the hash generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

In one embodiment, the selected recovery mechanism may be stored as part of the DID document 210 as shown in FIG. 3. In such embodiments, when a recovery process is needed, the DID owner 201 may use the recovery module to access the recovery mechanism 365 from the DID document 210. The DID owner 201 may then provide the required information and the recovery mechanism 365 will recover the key. Specific embodiments of the recovery mechanisms 365 will described in more detail to follow.

In other embodiments, the selected recovery mechanism 365 may be stored in a secure storage, such as the database 305. Alternatively, the selected recovery mechanism 365 may be hosted by a third party such as the provider of the DID lifecycle management module 320. In such embodiments, the recovery module 360 may access the secure storage or the third party and may then provide the required information so that the key is recovered.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Example Recovery Mechanisms

Figure 4:
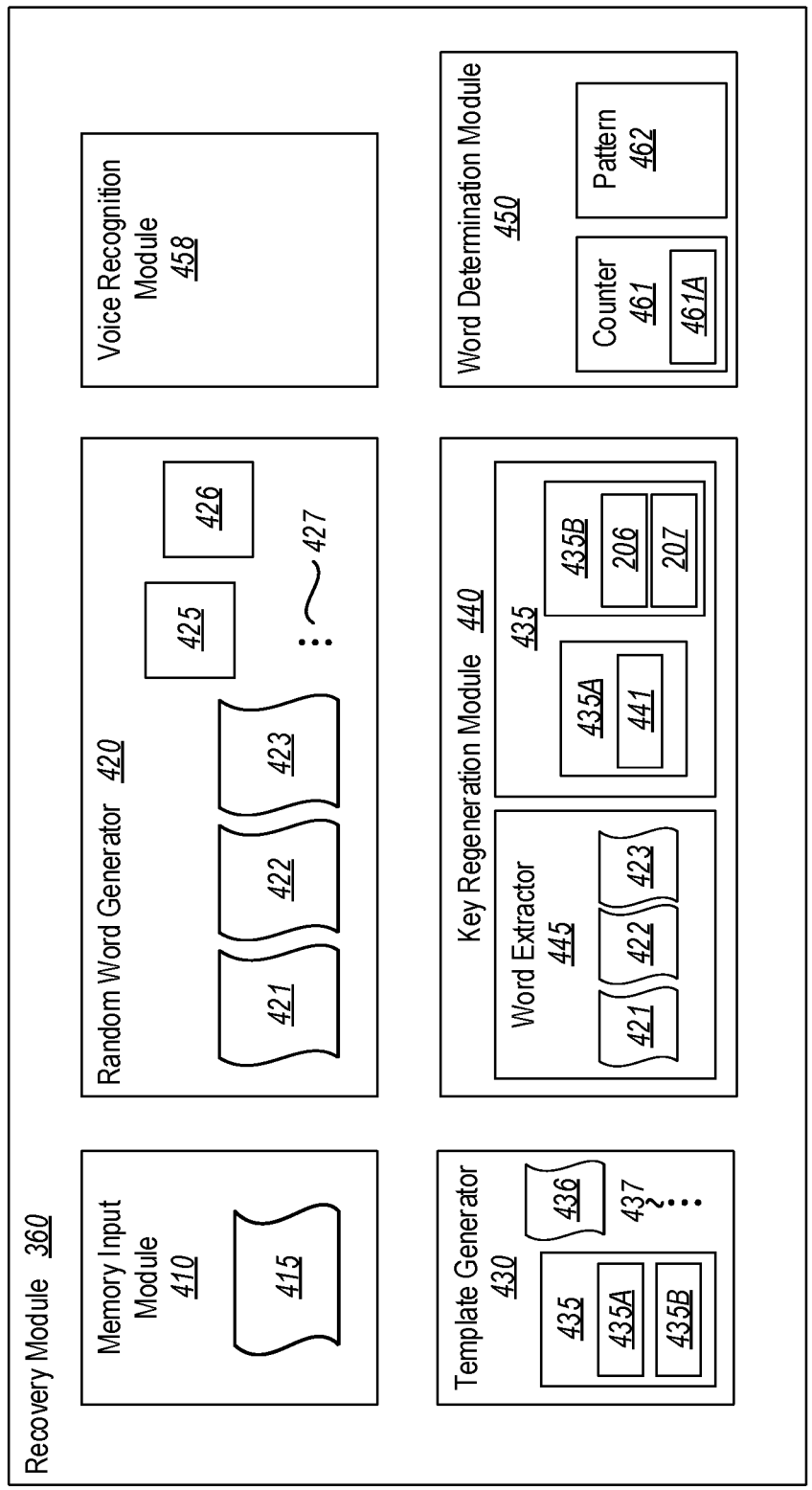
FIG. 4 illustrates an example recovery mechanism that utilizes a recovery module.

Attention is now made to FIG. 4, which illustrates one embodiment of a recovery mechanism 365 that utilizes the recovery module 360. In the embodiment, the recovery mechanism is deterministic based on an input memory and random words that are generated from the input memory. Unlike some conventional recovery mechanisms that generate random words that are unrelated to each other, the current embodiment uses words that are related to the input memory. Advantageously, the DID owner need not remember the unrelated words or have to store them in a location, where they may be accessed by a hostile party. Instead, the DID owner 201 need only remember the input memory (or at least a sufficient portion of the input memory) and the recovery mechanism will determine the words from the input memory. This process will be described in more detail to follow.

As illustrated, the recovery module may include a memory input module 410. In operation, the DID owner 201 may enter a memory 415 that is known by the DID owner. For example, the following memory 415 may be entered "I got married on a hot summer day in Tahoe. After the ceremony, we walked up from the beach to Riva Grill, the restaurant we had the reception at. My wife's aunt made us a big cheesecake as our wedding cake." Of course, any type of memory 415 that is known to the DID owner 201 may be used. Accordingly, the DID owner 201 may use a memory of an event that he or she was part of, an event that he or she may not have been part of, but knows about, or even an imaginary event. Thus, the embodiments disclosed herein are not limited by the type or content of the input memory 415. It will be appreciated that the DID owner 201 should use an input memory 415 that is not likely to be forgotten as the input memory 415 will be used in the recovery process as will be explained. The input memory 415 may be input in any reasonable manner including entering the memory by speaking the memory into a microphone or entering the memory by using a keyboard or other input device.

The recovery module 360 may also include a random word generator 420. In operation, the random word generator 420 may generate specific words 421, 422, 423, and any number of additional words as illustrated by ellipses 424 based on the input memory 415. In some embodiments, the number of specific words may be 12 or 24, although other number may be used. It will be appreciated that a higher number of words provides additional security.

In some embodiments, the random word generator 422 may throw out unimportant words such as definite and indefinite articles and prepositions (e.g., "the", "or" "and", "to") and only use important words from the input memory 415. For example, in the disclosed embodiment the random word 421 may be "married", the random word 422 may be "summer", the random word 423 may be "wedding", and the additional random words 424 may be words such as "ceremony", "restaurant", and "cake" as these are words that are important to the input memory 415. Advantageously, the DID owner 201 does not need to remember the random words 421-424 and does not need to store these words since he or she need only remember the memory as will be explained in more detail to follow. This provides a technical advantage over conventional systems that require a user to remember or at least record randomly generated words since the randomly generated words are not typically related to each other in any meaningful way.

The random word generator 420 may then generate a random sequence of bits 425. In some embodiments, the random sequence of bits will be 128 to 256 bits. In some embodiments a checksum value, typically 4 bits in length, may be added to the generated sequence of bits 425. The random word generator 420 may then divide the random sequence of bits into segments. For example, if the random generated sequence of bits was 128 bits and the checksum value was 4 bits, then the total bits would be 132. The random word generator would divide the 132 bits into 12 segments of 11 bits each. The random word generator 420 may then map or otherwise associate each of the segments with a specific random word 421-424 as represented by mapping 426. For instance, the first segment would be mapped to the random word 421, the second segment would be mapped to the random word 422, the third segment would be mapped to the random word 423, and so on until all the segments had been mapped to one of the generated random words. Thus, the random words 421-424 are able to represent the random sequence of bits 425 (including the checksum value) and may be entered in place of the random sequence of bits 425.

The recovery module 360 may also include a template generator 430. In operation, the template generator 430 may receive the random words 421-424 that have been mapped to the random sequence of bits 425. The template generator may then generate a template 435 that provides a first private key recovery mechanism 435A that will use the mapped random words 421-424 to generate a private key recovery seed 441. The first private key recovery mechanism 435A may be a key stretching function or some other like function that is able to generate the private key recovery seed 441 based on the random sequence of bits 425 that is represented by the random words 421-424. The template 435 may also define a second private key recovery mechanism 435B that uses the private key recovery seed 441 as an input to then regenerate the master private key 206. The second private key recovery mechanism 435B may be a function such as the HMAC-SHA512 algorithm or like algorithm that is able to regenerate the private key 206 based on the private key recovery seed 441 as an input. Although both the first and second private key recovery mechanisms 435A and 435B are shown as being in the same template, this need not be the case. In some embodiments, the mechanisms 435A and 435B may be included in separate templates as circumstances warrant.

In some embodiments, the template 435 may be stored in a secure storage, such as the database 305. Alternatively, the template 435 may be hosted by a third party such as the provider of the DID lifecycle management module 320. In such embodiments, the DID owner 201 may use the recovery module 360 to access the secure storage or the third party to retrieve the template 435.

In other embodiments, the DID owner 201 may desire to generate additional templates and to store the additional templates in various locations for additional security. Accordingly, the template generator 430 may generate an additional template 436 and any number of additional templates as illustrated by the ellipses 437. The additional templates 436 and 437 may include the same information as the template 435. Alternatively, they may include different information as circumstances warrant.

The recovery module 360 may further include a key regeneration module 440 that in operation may be used to regenerate the private key 206. The key regeneration module 440 may include a word extractor 445. When the DID owner 201 desires to restore the private key 206, because the private key 206 has been lost or for any other reason, the DID owner 201 may provide the input memory 415 that was previously provided to the random word generator 420 to the key regeneration module 440. The word extractor 445 may then parse the input memory 415 to extract from the input memory 415 entered the second time those words that correspond to the random words 421-424. Since the DID owner 201 is likely to remember the input memory 415, the word extractor 445 should be able to extract the random words from the input memory 415. As mentioned previously, this is a technical advantage as the DID owner 201 only needs to enter the input memory 415 and does not need to remember any random words. As long as the input memory 415 is correctly entered, the word extractor 445 will be able to extract the random words 421-424 that were previously generated based on the input memory 415.

The key generation module 440 may also access the template 435 that was previously generated from the location where the template is stored. The key generation module 440 may use the first private key recovery mechanism 435A and the extracted random words 421-424 to generate the private key recovery seed 441. The private key recovery seed 441, in one embodiment, may be a 512 bit random value. It will be appreciated that the embodiments disclosed herein are not limited by the type of private key recovery seed 441 that is generated in the manner described herein.

The key generation module 440 may then use the second private key recovery mechanism 435B and the private key recovery seed 441 to regenerate the private key 206. That is, the second private key recovery mechanism 435B may take the private key recovery seed 441 as an input. The second private key recovery mechanism 435B may then perform its specified operation on the private key recovery seed 441 to recover the private key 206. Once the private key 206 is recovered, the public key 207 (and any number of additional public keys) may be recovered based on the recovered private key 206.

In some embodiments, the recovery module 360 may include further measures that help to ensure that it is the DID owner 201 that is attempting to restore the private key 201 using the input memory 415. For example, there may be a situation where a hostile third party has in some manner determined the contents of the input memory 415 used to generate the random words 421-424. In such situations, the hostile third party may be able to use the input memory 415 to gain access to the private key 206. Accordingly, in some embodiments the recovery module 360 may include a voice recognition module 450. In such embodiments, the recovery module 360 may require that the DID owner 201 enter the input memory 415 by speaking the memory. The random word generator 420 and template generator 403 would then perform as previously described. At such time as the DID owner 201 desires to restore the private key 206, he or she may enter the input memory 450 again by speaking the input memory 415. The voice recognition module 450 may then determine if the voice that is speaking the input memory 415 matches the voice that initially spoke the input memory 415. If a match is determined, then the voice recognition module 450 may allow the word extractor 445 and the key regeneration module 440 to generate the private key recovery seed 441 and regenerate the private key 206 in the manner previously described.

In some instances, the DID owner 201 may initially provide the input memory 415 so that the word generation module 420 may generate the random words 421-424 in the manner previously described. However, when the DID owner 201 desires to restore the private key 206, he or she may not enter the memory 415 in exactly the same manner as the input memory was initially provided. For example, the DID owner 201 may only enter part of the input memory and may thus leave out one or more of the words of the memory that were used by the word generation module 420 to generate the random words 421-424 and that were mapped to the random sequence of bits 425. In such instances, leaving out the one or more words of the input memory 415 may result in the private key recovery seed 441 not being generated and subsequently the private key 206 not being restored.

Accordingly, in some embodiments the recovery module 360 may include a word determination module 460. The word determination module 460 may include a word counter 461. In operation, the word counter 461 may parse the input memory 415 when the input memory is entered the second time to restore the private key 206 after the word extractor has extracted the words that correspond to the random words 421-424. The word counter 461 may then count the number of words from the input memory that match the random words 421-424. If all the words are present, then the process may be allowed to continue. However, if the DID owner 201 only entered a partial version of the input memory 415, the word counter 461 may not be able to count all the words that match all of the random words 421-424. In such cases, the word counter 461 may determine how many of the words were entered and if this is a sufficient number. For example, the word counter 461 may access a threshold 461A that specifies a sufficient number of words that should be entered as part of the input memory 415 when recovering the private key 206 when not all of the words are entered. If a sufficient number is found, then the recovery module may provide any of the random words 421-424 that were not entered so that the required random words 421-424 are available as an input to the mechanism 435A to generate the private key recovery seed 441. As mentioned above, the word generation module 420 records the mapping 426 between the random words 421-424 and the random bit sequence 426 and is able to use this mapping to provide those random words that are not extracted from the input memory 415 entered to recover the private key 206. Of course, if the word counter 461 does not find a sufficient number words from the input memory 415 that match all of the random words 421-424, the process will not be allowed to continue. Since the DID owner 201 is likely to at least remember most of the input memory 415 and therefore enter a large portion of the memory 415 that was initially entered, any time the word counter 461 does not find a sufficient number words from the input memory 415 that match the random words 421-424 it likely shows that it is not the DID owner 201 who is entering the input memory 415 to recover the private key 206.

A specific example will now be explained. Suppose that 12 random words 421-424 were generated based on the input memory 415 that was initially entered. Further suppose that the DID owner 201 did not completely enter the input memory 415 the second time when restoring the private key 206. In this example, the word counter 461 may only count that nine of the random words are included the second time the input memory 415 is entered. The word counter 461 may determine, by accessing the threshold 461A in one embodiment, if nine is a sufficient number. If nine is a sufficient number, those random words 421-424 not included will be provided for use in generating the seed 441 along the random words 421-424 that are extracted from the second time the input memory 415 is entered. If nine is not sufficient, then the private key 206 will not be recovered.

In another embodiment, the recovery module may allow for variability when the DID owner 201 enters the input memory 415 the second time to recover the private key 206. In such embodiments, the word generator 420 may generate a number of random words 421-424 that is greater than the number needed for a one-to-mapping between the segments of the random sequence of bits 425 and the random words as described previously. For example, suppose that 12 random numbers 421-424 are needed for the one-to-one mapping as described above. In the embodiment, the word generator 420 may generate 20 random words 421-424 based on words from the input memory 415. These 20 random words may then be mapped to the segments of the random sequence of bits 425 in various manners so that any one of the 20 random words would map to a particular sequence.

When the DID owner 201 enters the input memory 415 the second time to recover the private key 206, the DID owner 201 may enter a version of the input memory 415 that is different from, although generally the same as, the version of the input memory 415 that was initially entered. The word counter 461 may then parse the newly input memory 415 to determine which of the random words are included in this version of the input memory. If the word counter determines that at least 12 of the 20 random words 421-424 are present, then these 12 random words 421-424 may be used by the mechanism 435A in the manner previously described to generate the private key recovery seed 441. Accordingly, the embodiments disclosed herein allow for variability in the recollection of the input memory 415 while still ensuring that the DID owner 201 does not need to remember or record any unrelated random words to generate the private key recovery seed 441.

As mentioned previously, there may be instances where a hostile third party has obtained the input memory 415 (or at least a close approximation of the input memory) and attempts to use this input memory to generate the private key 206 in the manner previously described. To help protect against this, in some embodiments the word determination module 460 may further include a pattern module 462. In operation, the pattern module 462 may analyze the pattern of the input memory 415 that is initially entered to generate the random words 421-424. The pattern module 462 may then analyze the pattern of the input memory 415 that is input the second time to recover the private key 206. The pattern module may look for such patterns as differences in sentence structure, such as length of sentences, where words are placed in sentences, and time in between entering the sentences and/or words if the input memory 415 is spoken when being entered. The pattern module may also determine the order of the sentences when entering the input memory 415. The pattern module 462 may then compare the various patterns from when the input memory 415 is input the second time to recover the private key 206 with the initial time the input memory 415 was entered. If the patterns are sufficiently close, then the pattern module may infer that it was the DID owner 201 who entered the input memory both times. However, if the patterns are sufficiently different, then the pattern module 262 may infer that that it was a different entity than the DID owner 201 who entered the input memory to recover the private key 206.

For example, suppose when the DID owner 201 entered the input memory 415 discussed previously, he or she used the words "married", "summer", "wedding", "ceremony", "restaurant", and "cake" in a specific manner and entered the sentences containing these words with a specific sentence structure. If a hostile third party attempted to enter the input memory 415 to recover the private key 206, the hostile third party would be unlikely to use the words "married", "summer", "wedding", "ceremony", "restaurant", and "cake" in the same manner and with the same patterns as the DID owner 201. Accordingly, the different patterns may be determined by the pattern module 462 and it may be ascertained that it was not the DID owner 201 who entered the input memory 415 to restore the private key.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
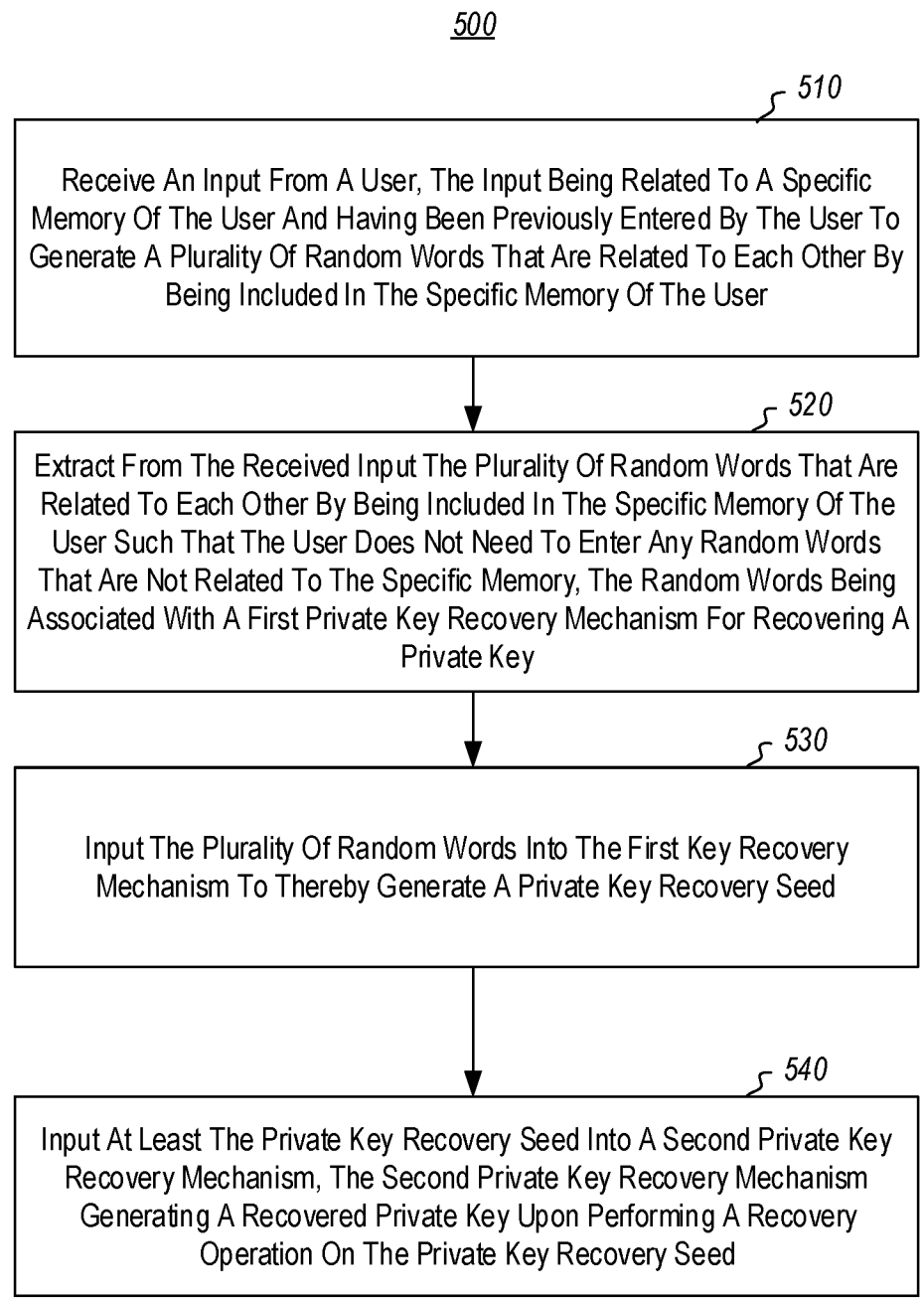
FIG. 5 illustrates a flow chart of an example method for generating a private key recovery seed based on random words extracted from an input memory of a user and for using the private key recovery seed to recover the private key.

FIG. 5 illustrates a flow chart of an example method 500 for generating a private key recovery seed based on random words extracted from an input memory of a user and for using the private key recovery seed to recover the private key. The method 500 will be described with respect to one or more of FIGS. 2-4 discussed previously.

The method 500 includes receiving an input from a user, the input being related to a specific memory of the user (act 510). The input from the user was previously entered by the user to generate a plurality of random words that are related to each other by being included in the specific memory of the user. For example, as previously discussed the DID owner 201 may enter the input memory 415 that is related to a specific memory of the DID owner. The input memory 415 may be used to generate the random words 421-424, where the random words are included in the input memory 415. The DID owner 201 may then enter the input memory a second time to recover the private key 206.

The method 500 includes extracting from the received input the plurality of random words that are related to each other by being included in the specific memory of the user (act 520). The user does not need to enter any random words that are not related to the specific memory. The random words are associated with a first private key recovery mechanism for recovering a private key. For example, as previously discussed the word extractor 445 may parse the input memory 415 and extract the random words 421-424. Accordingly, the DID owner need not remember, record, or enter any random words that are not part of the input memory 415. The random words 421-424 may be mapped or associated with the first private key recovery mechanism 435A in the manner described herein.

The method 500 includes inputting the plurality of random words into the first key recovery mechanism to thereby generate a private key recovery seed (act 530). For example, as previously discussed the random words 421-424 may be input into the first private key recovery mechanism 435A to generate the private key recovery seed 441.

The method 500 includes inputting at least the private key recovery seed into a second private key recovery mechanism (act 540). The second private key recovery mechanism generates a recovered private key upon performing a recovery operation on the private key recovery seed. For example, as previously discussed the private key recovery seed 441 may be input into the second private key recovery mechanism 435B to generate the recovered private key 206 in the manner described herein.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more hardware computer-readable media devices having thereon computer-executable instructions that are structured such that, when executed by the one or more processors, cause the computing system to:
receive an input from a user who is an owner of a decentralized identifier, the input being related to a specific memory of the user and having been previously entered by the user to generate a predetermined number of random words that are related to each other by being included in the specific memory of the user, the predetermined number of random words being used to generate a seed, which is then used to generate a private key and a public key pair associated with the decentralized identifier, and the public key being recorded on a distributed ledger, and the private key and data recorded on the distributed ledger being used to authenticate that the user is the owner of the decentralized identifier;
extract from the received input the predetermined number of random words that are related to each other by being included in the specific memory of the user such that the user does not need to enter any random words that are not related to the specific memory to recover a private key, the random words being associated with a first private key recovery mechanism for recovering the private key;
input the predetermined number of random words into the first key recovery mechanism to thereby generate a private key recovery seed; and
input at least the private key recovery seed into a second private key recovery mechanism, the second private key recovery mechanism generating a recovered private key upon performing a recovery operation on the private key recovery seed, the recovered private key being same as the private key associated with the decentralized identifier, and configured to be used with data recorded on the distributed ledger to authenticate that the user is the owner of the decentralized identifier.

2. The computing system in accordance with claim 1, wherein the first key recovery mechanism is configured to:
generate a plurality of random bits;
divide the plurality of random bits into a plurality of segments; and
associate each of the predetermined number of random words with a specific segment of the plurality of segments.

3. The computing system in accordance with claim 1, wherein definite articles, indefinite articles, and prepositions are not included in the generated predetermined number of random words that are related to the specific memory of the user.

4. The computing system in accordance with claim 1, wherein the computer-executable instructions are structured to further cause the computing system to:
generate one or more public keys based on the recovered private key.

5. The computing system in accordance with claim 1, wherein the computing system includes a voice recognition module and wherein the computer-executable instructions are structured to further cause the computing system to:
receive the input from the user that is related to the specific memory of the user via the input being spoken by the user into the computing system; and
use the voice recognition module to compare the input from the user with the input entered previously to generate the random words to determine if there is a match of the voice that entered the input both times, wherein the computing system only recovers the private key if there is a match of the voices.

6. The computing system in accordance with claim 1, wherein the computer-executable instructions are structured to further cause the computing system to:
count the number of random words that are extracted from the input of the user that is related to the specific memory of the user; and
determine if the number of extracted random words is at least equal to a predetermined number of random words that is indicative that the input is received from the same user who previously entered in input to generate the predetermined number of random words, wherein the computing system only recovers the private key if the number of extracted random words at least equals the predetermined number of random words.

7. The computing system in accordance with claim 6, wherein the predetermined number of random words is based on a predetermined threshold.

8. The computing system in accordance with claim 1, wherein the computer-executable instructions are structured to further cause the computing system to:
generate a first number of the predetermined number of random words from the input of the user that is related to the specific memory of the user, the first number of random words being higher than a second number of random words that are required by the first private key recovery mechanism to generate the private key recovery seed, wherein any combination of the first number of random words that is equal to the second number of random words is useable by the first private key recovery mechanism to generate the private key recovery seed;
count the number of random words that are extracted from the input of the user that is related to the specific memory of the user; and
determine if the number of extracted random words is at least equal to the second number of random words and if the extracted words are all random words included in the first number of random words.

9. The computing system in accordance with claim 1, wherein the computer-executable instructions are structured to further cause the computing system to:
analyze a first pattern of the input of the user that is related to the specific memory of the user at a time the predetermined number of random words are generated;
analyze a second pattern of the of the input of the user that is related to the specific memory of the user at the time the predetermined number of random words are extracted from the input; and
compare the first and second patterns to determine if the patterns substantially close to each other;
wherein the computing system only recovers the private key if the first and second patterns are substantially close to each other.

10. A method for generating a private key recovery seed based on random words extracted from an input memory of a user and for using the private key recovery seed to recover the private key, the method comprising:
receiving an input from a user who is an owner of a decentralized identifier, the input being related to a specific memory of the user and having been previously entered by the user to generate a predetermined number of random words that are related to each other by being included in the specific memory of the user, the predetermined number of random words being used to generate a seed, which is then used to generate a private key and a public key par associated with the decentralized identifier, and the public key being recorded on a distributed ledger, and the private key and data recorded on the distributed ledger being used to authenticate that the user is the owner of the decentralized identifier;
extracting from the received input the predetermined number of random words that are related to each other by being included in the specific memory of the user such that the user does not need to enter any random words that are not related to the specific memory to recover a private key, the random words being associated with a first private key recovery mechanism for recovering the private key;
inputting the predetermined number of random words into the first key recovery mechanism to thereby generate a private key recovery seed; and
inputting at least the private key recovery seed into a second private key recovery mechanism, the second private key recovery mechanism generating a recovered private key upon performing a recovery operation on the private key recovery seed, the recovered private key being same as the private key associated with the decentralized identifier, and configured to be used with data recorded on the distributed ledger to authenticate that the user is the owner of the decentralized identifier.

11. The method in accordance with claim 10, further comprising:
generating a plurality of random bits;
dividing the plurality of random bits into a plurality of segments; and
associating each of the predetermined number of random words with a specific segment of the plurality of segments.

12. The method in accordance with claim 10, wherein definite articles, indefinite articles, and prepositions are not included in the generated predetermined number of random words that are related to the specific memory of the user.

13. The method in accordance with claim 10, further comprising:
generating one or more public keys based on the recovered private key.

14. The method in accordance with claim 10, further comprising:
receiving the input from the user that is related to the specific memory of the user via the input being spoken by the user; and
using voice recognition to compare the input from the user with the input entered previously to generate the random words to determine if there is a match of the voice that entered the input both times,
wherein the private key is only recovered if there is a match of the voices.

15. The method in accordance with claim 10, further comprising:
counting the number of random words that are extracted from the input of the user that is related to the specific memory of the user; and
determining if the number of extracted random words is at least equal to a predetermined number of random words that is indicative that the input is received from the same user who previously entered in input to generate the predetermined number of random words,
wherein the private key is only recovered if the number of extracted random words at least equals the predetermined number of random words.

16. The method in accordance with claim 15, wherein the predetermined number of random words is based on a predetermined threshold.

17. The method in accordance with claim 10, further comprising:
generating a first number of the predetermined number of random words from the input of the user that is related to the specific memory of the user, the first number of random words being higher than a second number of random words that are required by the first private key recovery mechanism to generate the private key recovery seed, wherein any combination of the first number of random words that is equal to the second number of random words is useable by the first private key recovery mechanism to generate the private key recovery seed;

counting the number of random words that are extracted from the input of the user that is related to the specific memory of the user; and determining if the number of extracted random words is at least equal to the second number of random words and if the extracted words are all random words included in the first number of random words.

18. The method in accordance with claim 10, further comprising:

analyzing a first pattern of the input of the user that is related to the specific memory of the user at a time the predetermined number of random words are generated;

analyzing a second pattern of the of the input of the user that is related to the specific memory of the user at the time the predetermined number of random words are extracted from the input; and comparing the first and second patterns to determine if the patterns substantially close to each other;

wherein the private key is only recovered if the first and second patterns are substantially close to each other.

19. A computer program product comprising one or more hardware computer-readable storage media devices having thereon computer-executable instructions that are structured such that, when executed by one or more processors of a computing system, cause the computing system to generate a private key recovery seed based on random words extracted from an input memory of a user and use the private key recovery seed to recover the private key, the computing system caused to:

receive an input from a user who is an owner of a decentralized identifier, the input being related to a specific memory of the user and having been previously entered by the user to generate a predetermined number of random words that are related to each other by being included in the specific memory of the user, the predetermined number of random words being used to generate a seed, which is then used to generate a private key and a public key pair associated with the decentralized identifier, and the public key being recorded on a distributed ledger, and the private key and data recorded on the distributed ledger being used to authenticate that the user is the owner of the decentralized identifier;

extract from the received input the predetermined number of random words that are related to each other by being included in the specific memory of the user such that the user does not need to enter any random words that are not related to the specific memory to recover a private key, the random words being associated with a first private key recovery mechanism for recovering the private key;

input the predetermined number of random words into the first key recovery mechanism to thereby generate a private key recovery seed; and input at least the private key recovery seed into a second private key recovery mechanism, the second private key recovery mechanism generating a recovered private key upon performing a recovery operation on the private key recovery seed, the recovered private key being same as the private key associated with the decentralized identifier, and configured to be used with data recorded on the distributed ledger to authenticate that the user is the owner of the decentralized identifier.

20. The computer program product in accordance with claim 19, the computing system further caused to:

generate a plurality of random bits;

divide the plurality of random bits into a plurality of segments; and associate each of the predetermined number of random words with a specific segment of the plurality of segments.

* * * * *